United States Patent [19]
Ystebo

[11] 4,408,426
[45] Oct. 11, 1983

[54] STORAGE BIN FLOOR STRUCTURE

[76] Inventor: Stuart Ystebo, 2421 - 16th Ave. South, Moorehead, Minn. 56560

[21] Appl. No.: 289,277

[22] Filed: Aug. 3, 1981

[51] Int. Cl.³ .............................................. E04H 7/00
[52] U.S. Cl. ..................................... 52/245; 52/192; 52/309.1; 52/828; 52/247; 52/169.7
[58] Field of Search ................................ 52/192–197, 52/82, 309.1, 828, 169.7, 247; 222/460, 462, 185, 245

[56] References Cited

U.S. PATENT DOCUMENTS

| | | | |
|---|---|---|---|
| 249,095 | 11/1881 | Reyburn et al. | 182/153 |
| 306,642 | 10/1884 | Porter | 182/155 |
| 1,377,095 | 5/1921 | Rupp | 182/183 |
| 2,551,216 | 5/1951 | Martin | 99/235 |
| 3,198,286 | 8/1965 | Wilson | 182/155 |
| 3,742,664 | 7/1973 | Reding | 52/197 |
| 4,078,348 | 3/1978 | Rothman | 52/192 |
| 4,217,739 | 8/1980 | Granger | 52/197 |
| 4,224,770 | 9/1980 | Petty | 52/192 |

FOREIGN PATENT DOCUMENTS

| | | | |
|---|---|---|---|
| 404278 | 6/1966 | Australia | 52/197 |
| 28314 | 6/1903 | Switzerland | 182/186 |

*Primary Examiner*—John E. Murtagh
*Assistant Examiner*—Henry E. Raduazoa
*Attorney, Agent, or Firm*—Burd, Bartz & Gutenkauf

[57] ABSTRACT

A bulk material storage bin and a floor structure for such a bin for storing grain or like bulk commodities. The floor structure of the bin has downwardly converging side walls preferably having a smooth surface. In a preferred embodiment, the floor structure is conical in shape with a downwardly directed apex. As bulk material is emptied from the storage bin, it travels down the side walls of the floor to the apex where it is conveyed outwardly. Piles of residual bulk material are not accumulated along the floor structure.

10 Claims, 7 Drawing Figures

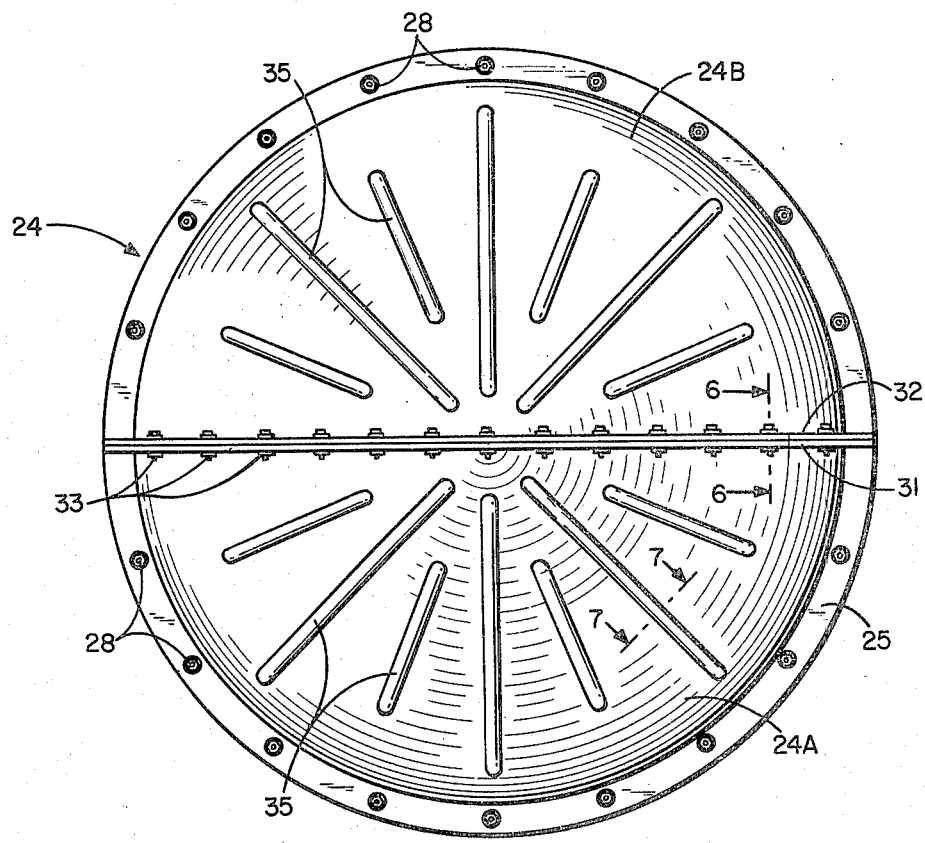
FIG. 5
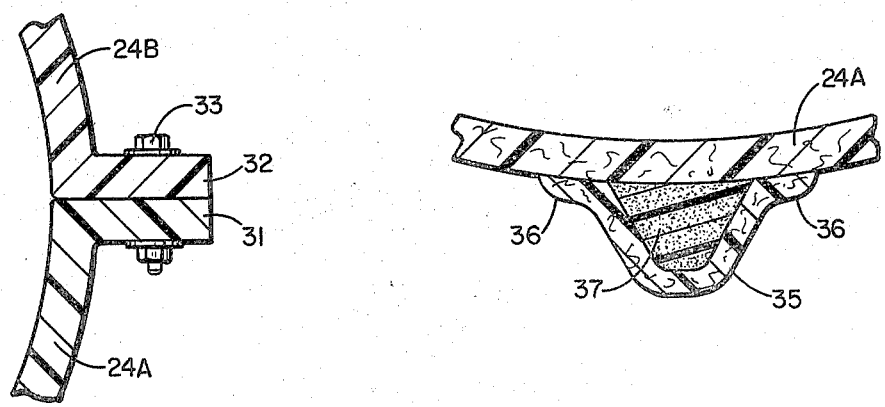
FIG. 6
FIG. 7

STORAGE BIN FLOOR STRUCTURE

SUMMARY OF THE INVENTION

Bulk material bins such as grain storage bins are typically cylindrical in shape and have flat floors. Grain is introduced to the bin for storage by top loading or filling from an upper portion of the bin. Grain is removed from the bin through a lower portion thereof. Typically upon emptying of the bin, a conveying means such as an auger is inserted into the bin near the floor and grain is conveyed away from the bin. As the level of grain in the bin is lowered, grain collects around the perimeter of the bin floor remote from the location of the auger. This remote grain must be manually moved to the location of the auger for transport to a location outside of the bin. This is done either manually or through the use of machines but in either case results in lost time and some lost grain.

The invention relates to a grain storage bin and in particular to a floor structure for a grain storage bin which increases the storage capacity of the bin and permits easy and substantially complete emptying of the bin. The floor structure is subterranean providing the bin with a lower inside surface that is conical in shape with a downwardly located apex. The conical portion of the floor has a diameter at the base of the bin which spans substantially the diameter of the bin. Upon filling the bin with grain, the subterranean volume provided by the floor beneath the ground level adds to the capacity of the bin. Upon emptying of the bin, an auger or suitable other conveying means is placed so as to be located proximate the apex of the floor structure. As the bin is emptied, the grain remaining in the bin accumulates at the apex of the floor structure so as to be completely removed from the bin. The floor structure can be formed of two identical halves bolted or otherwise secured together and placed at the base of an existing bin. The floor structure is formed of a material having a low coefficient of friction, such as fiberglass, whereby grain will not adhere to the walls thereof as it is emptied from the bin.

IN THE DRAWINGS

FIG. 5 is a bottom view of the conical floor structure of FIG. 1;

FIG. 6 is an enlarged sectional view of a portion of the conical floor structure of FIG. 5 taken along the line 6—6 thereof; and FIG. 7 is an enlarged sectional view of a portion of the conical floor structure of FIG. 5 taken along the line 7—7 thereof.

DESCRIPTION OF A PREFERRED EMBODIMENT

Figure 1:
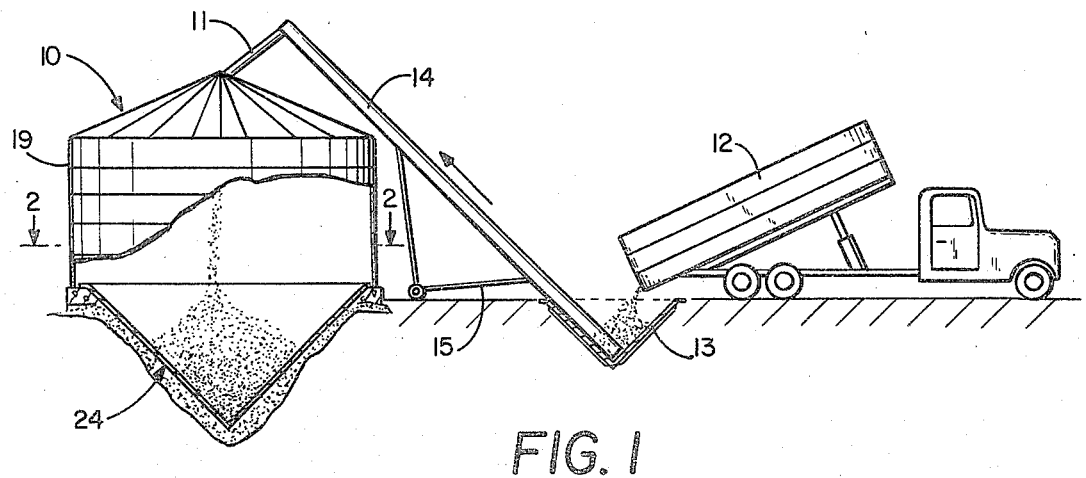
FIG. 1 is a diagrammatic view of a bulk material storage bin equipped with a conical floor structure of the invention.

Referring to the drawings, there is shown in FIG. 1 a bulk material or grain storage bin 10 being loaded with grain through a chute 11 disposed in the upper portion thereof. Grain is unloaded from a grain truck 12 into a downwardly orientated conical hopper 13 where it is picked up by an auger 14 supported on an auger stand 15 and delivered to the chute 11 where it drops into the interior of bin 10 for storage. The following description is directed to a bin for storing grain, such as corn, wheat, oats, soybeans, sunflower seeds and the like. The bin and floor structure of the invention can be used with other types of bulk materials.

Figure 4:
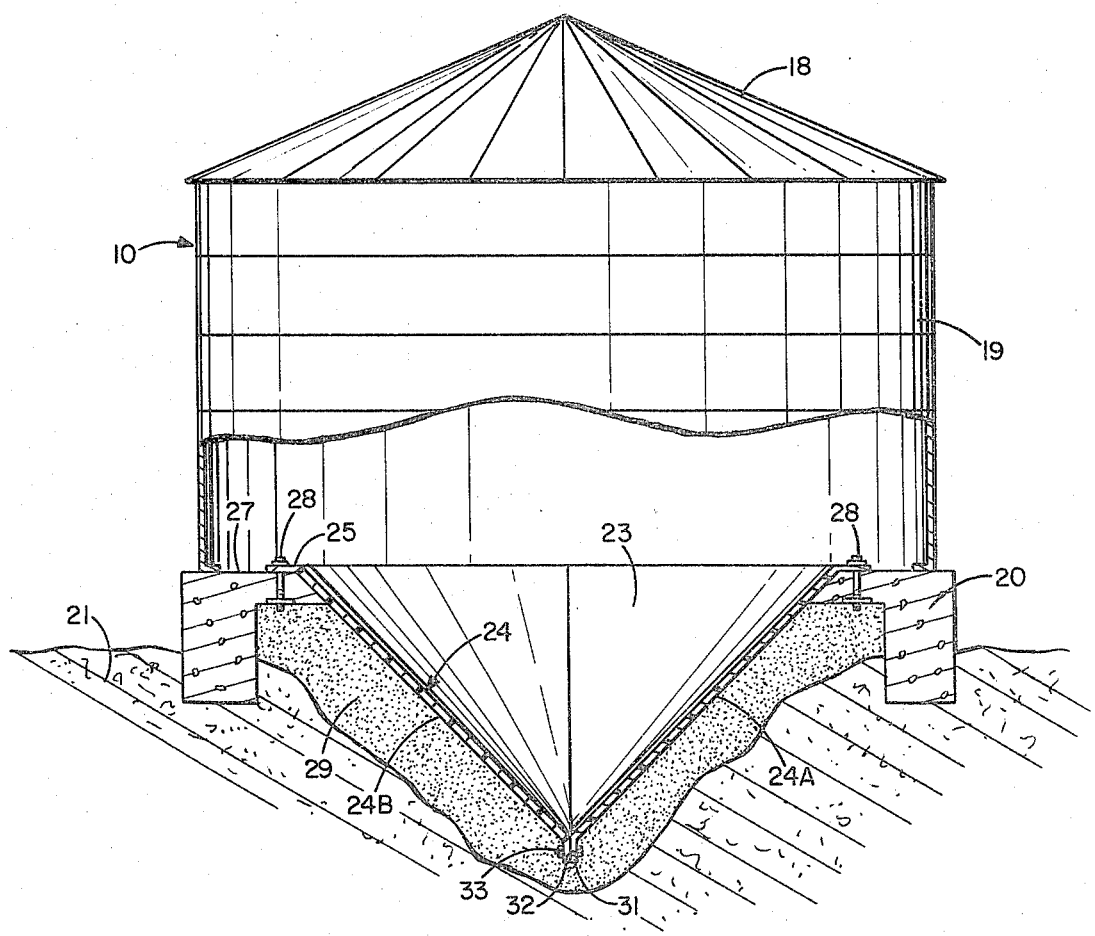
FIG. 4 is a sectional view of the conical floor structure and storage bin of FIG. 2 taken along the line 4—4 thereof.

Referring more particularly to FIG. 4, bin 10 has a conical roof 18 and a cylindrical closed perimeter side wall 19. Side wall 19 rests on a circular foundation 20 erected with respect to the earth 21. Foundation 20 has a central circular opening 23 in which is accommodated a subterranean modular bin floor assembly or structure 24. Bin floor structure 24 has downwardly converging side walls and is shown to be conical in shape having a downwardly directed apex. The floor structure 24 has two semi-cone shaped side walls 24A and 24B that slope downwardly and inwardly at an angle of about 45°. Preferrably, the side walls 24A and 24B each have an angle of at least 30° below the horizontal plane of the top of the floor structure 24. The upper edge of floor structure 24 has an outwardly extended radial flange 25 which rests on adjoining edges of the foundation 20. The diameter of foundation 20 is greater than that of the upper edge of floor structure 24 whereby a ledge or walkway 27 is provided along the inside circumference of side wall 19 for access by a person to the interior of bin 10 as for service or cleaning or the like. Floor structure 24 is fastened to foundation 20 by a plurality of anchors or nut and bolt assemblies 28 extended through the flange 25 and the adjacent perimeter of the opening 23 of foundation 20. Floor structure 24 is installed in a suitably provided hole beneath the side wall 19 and can be backed by suitable support or back fill material 29 such as sand, crushed rock or the like.

Figure 2:
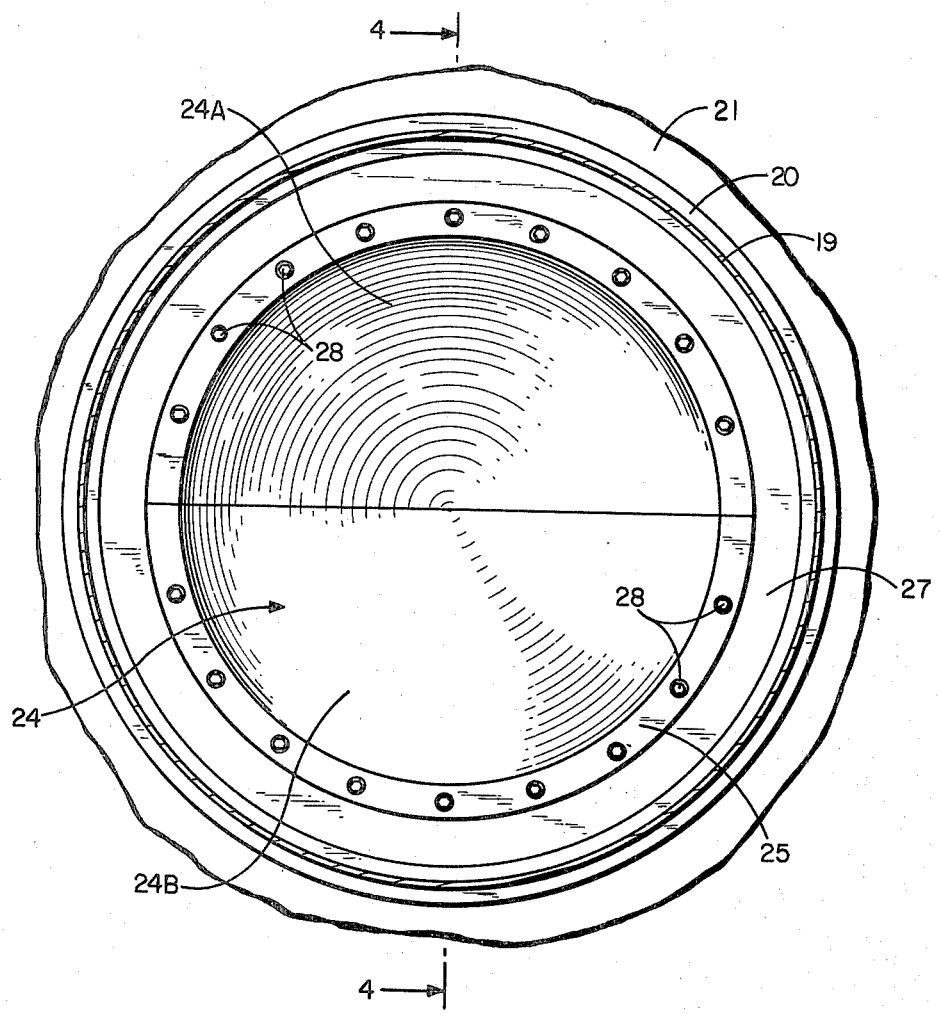
FIG. 2 is an enlarged sectional view taken along the line 2—2 of FIG. 1.
Figure 3:
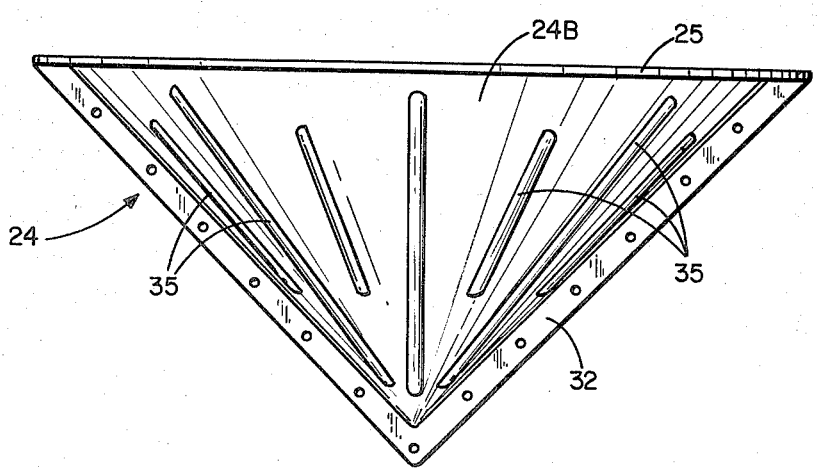
FIG. 3 is an enlarged side elevational view of the conical floor structure of FIG. 1.

The interior surface of floor structure 24 is smooth whereby bulk material will not adhere or cling upon emptying of bin 10. Floor structure 24 is advantageously formed of two substantially identical semi-conical or half sections or panels 24A, 24B of material such as plastic reinforced with glass fibers, molded fiberglass or the like as shown in FIG. 2. Each semi-conical half section 24A and 24B has outwardly extended flanges 31 and 32 located along adjacent edges of the half sections in assembled relationship to form a full cone. Half section 24A has flange 31. Half section 24B has flange 32, as shown in FIGS. 5 and 6. In assembled relationship, flanges 31, 32 are in abutting relationship and are held together by a plurality of nut and bolt assemblies 33 to form a full cone as shown. Other means, as rivets, adhesives and the like, can be used to join the half sections together.

For purposes of strength, a plurality of ribs 35 are attached to the outer surface of conical floor structure 24. Each rib 35 is generally radially orientated, as shown in FIG. 5. As shown in FIG. 7, a rib 35 can be a hollow plastic member having feet or linear lips 36 bonded to the exterior wall of cone 24. The rib 35 is located over a core 37 of expanded foam plastic, as urethane foam. Ribs 35 provide structural integrity and rigidity to the cone floor structure 24 while leaving the inside surface smooth.

In use, bulk material such as grain is loaded in bin 10 as shown in FIG. 1. The storage capacity of bin 10 is significantly increased by the volume added by subterranean conical floor structure 24. The plastic reinforced with glass fibers is structurally strong, rust and water proof. Moisture does not move through the floor structure 24 into the grain. To empty the bin 10, conveying means such as an auger (not shown) is placed in the lower portion of the bin. The auger can initially be placed with an end portion positioned in the apex of conical floor structure 24, or it can be positioned so that the end will eventually work its way to the apex as grain is emptied from the bin. With the end of the auger situated in the apex of conical floor structure 24, gravity moves the grain remaining in the conical floor 24 toward the apex where it is moved out by the conveyor. Bunches of bulk material are not left on the floor structure. The small amount of residual grain left on the walkway 27 is easily swept into the opening of the conical floor structure 24 to be conveyed outward.

While there has been shown and described a certain preferred embodiment of the invention, it will be apparent that certain deviations or changes in size and materials may be had without departing from the scope and spirit of the invention.

The embodiments of the invention in which an exclusive property or privilege is claimed are defined as follows:

1. A bulk material storage facility comprising:
   generally upright side walls defining a closed perimeter for containing a bulk material;
   floor means conical in shape disposed within the perimeter defined by the side walls, said floor means including a modular conical member with downwardly convergent wall means converging toward an apex at an angle of at least 30° below a horizontal plane;
   said floor means including a generally horizontal portion disposed adjacent the side walls in surrounding relationship to the modular member and of a width sufficient to permit passage by a person;
   said modular conical member having an outwardly directed peripheral flange located at its upper edge and extending over the horizontal portion and including means assembling said peripheral flange to the horizontal portion.

2. The bulk material storage facility of claim 1 wherein:
   said conical member is comprised of two substantially identical semi-conical sections in assembled relationship.

3. The bulk material storage facility of claim 2 wherein:
   each semi-conical section has a flange located on edges abutting the opposite section, and including a plurality of fastening means disposed between said flanges to hold said sections in assembled relationship.

4. The bulk material storage facility of claim 3 including:
   a plurality of radial ribs disposed on the outer surface of said semi-conical sections for purposes of strength and rigidity.

5. The bulk material storage facility of claim 4 wherein:
   said semi-conical sections are formed of plastic reinforced with glass fibers.

6. The bulk material storage facility of claim 1 wherein:
   said generally upright side walls are in a cylindrical orientation to form a storage bin;
   a circular foundation, said side walls being situated on said circular foundation, said circular foundation having said horizontal portion extended inwardly from the perimeter of said side walls.

7. The bulk material storage facility of claim 6 wherein:
   said conical member is comprised of two substantially identical semi-conical sections in assembled relationship.

8. The bulk material storage facility of claim 7 wherein:
   each semi-conical section has a flange located along edges adjacent the opposite conical section, said flanges being assembled together to assemble the semi-conical sections together.

9. A floor structure for a storage bin comprising:
   a first semi-conical section;
   a second semi-conical section substantially symmetrical to the first semi-conical section;
   means assemblying the first and second semi-conical sections to form a full conical structure locatable at the base of a storage bin;
   said first and second semi-conical sections having flanges along adjacent edges, said means assemblying the first and second sections together including fastening means disposed between said flanges;
   said first and second semi-conical sections being substantially identical and having outwardly directed peripheral flanges located at their upper edges and extendable over a horizontal portion of a floor surrounding the first and second semi-conical sections; and
   a plurality of downwardly directed radial ribs located on the exterior surfaces of said first and second conical sections for purposes of strength and rigidity.

10. The floor structure of claim 9 wherein:
   said first and second semi-conical sections are formed of plastic reinforced with glass fibers, each of said sections having a smooth interior surface.

* * * * *